United States Patent [19]

Kim

[11] Patent Number: 5,618,456
[45] Date of Patent: Apr. 8, 1997

[54] IMPROVEMENT OF SURFACE PROPERTY OF TIP AND NOZZLE FOR GAS WELDER MADE OF COPPER AND COPPER ALLOYS BY CHEMICAL CONVERSION COATING TREATMENT

[75] Inventor: Chang-Joo Kim, Kyungnam, Rep. of Korea

[73] Assignee: Korea Institute of Machinery & Metals, Daejeon-Si, Rep. of Korea

[21] Appl. No.: 445,561

[22] Filed: May 23, 1995

[30] Foreign Application Priority Data

May 24, 1994 [KR] Rep. of Korea ............... 94-11494

[51] Int. Cl.⁶ .................................................. B23K 9/28
[52] U.S. Cl. ................... 219/137.61; 148/269; 228/54; 228/118
[58] Field of Search ................ 148/269; 228/54, 228/118; 219/137.61, 137.43

[56] References Cited

FOREIGN PATENT DOCUMENTS 1064419  6/1976  Japan ........................... 219/137.43
2201112  8/1988  United Kingdom ........... 219/137.6

Primary Examiner—Sam Silverberg
Attorney, Agent, or Firm—Nikaido Marmelstein Murray & Oram LLP

[57] ABSTRACT

A method for improving the tip and nozzle of a gas welder in which a conventional or new surface oxidation chemical treatment was applied to improve the surface properties of the tip and nozzle of a gas welder made of copper or copper alloys. Continuous welding operation could then be possible for extended periods of time. If a black copper oxide layer is formed by chemical conversion coating treatment on the surface of the nozzle which is made of copper or copper alloys, then the splatters do not easily stick to the surface. Further, even if the splatters stick, they are more easily removed. In the case of the tip, a black copper oxide layer formed by chemical conversion coating treatment in the small hole of the tip makes the supply of the filler metal wire flow smoothly without troubles. Further, the black copper oxide layer formed by chemical conversion coating treatment also inhibits the sticking of splatters, so that the supply of the filler metal wire is smooth. The filler metal wire can be supplied without discontinuity at least during a limited life time which depends on the properties of the base material.

7 Claims, 1 Drawing Sheet

IMPROVEMENT OF SURFACE PROPERTY OF TIP AND NOZZLE FOR GAS WELDER MADE OF COPPER AND COPPER ALLOYS BY CHEMICAL CONVERSION COATING TREATMENT

FIELD OF THE INVENTION

The present invention relates to a method for improving the surface property of the tip and nozzle for a gas welder made of copper or copper alloys by chemical conversion cooling treatment.

BACKGROUND OF THE INVENTION

In a gas welder such as the $CO_2$ welder, as shown in FIG. 1, the tip and nozzle are functional parts. The filler metal wire is led through the hole of tip and atmosphere gas is supplied through the nozzle. Meanwhile, the tip and nozzle are made of copper or copper alloys which are superior in the thermal conductivity, as well as having a certain level of strength.

To look into the current problem, many free spatters are sticked to the inner wall and the mouth of nozzle to make a thick deposition as long as welding. The thick spatter layer was a cause of inefficient supply of gas, and it was difficult to be removed. And in case of the tip, on account of a trouble something like the arc, it stopped the filler metal wire feeding.

In that case, The welding operation has to be stopped and dressed the nozzle to remove the spatter layer, and coated a preventing cream on the mouth and inner wall of the nozzle to avoid the deposition of spatters. Meanwhile, in the case of the tip, the end of the tip is ground or cleaned. In a more severe case, the tip has to be replaced with a new one.

SUMMARY OF THE INVENTION

The object of this invention is to improve the surface property of the nozzle and tip for gas welder which are the deposition of spatters on the nozzle mouth or the stick of filler metal wire in the tip hole. And a conventional or new chemical conversion surface treatment for the formation of copper oxide by chemical conversion cooling treatment layer is applied to this purpose, so that a long time continuous welding operation could be possible.

BRIEF DESCRIPTION OF THE DRAWINGS

It is shown a schematic diagram of a tip and nozzle for a gas welder in FIG. 1.

DESCRIPTION OF THE PREFERRED EMBODIMENT

Figure 1:
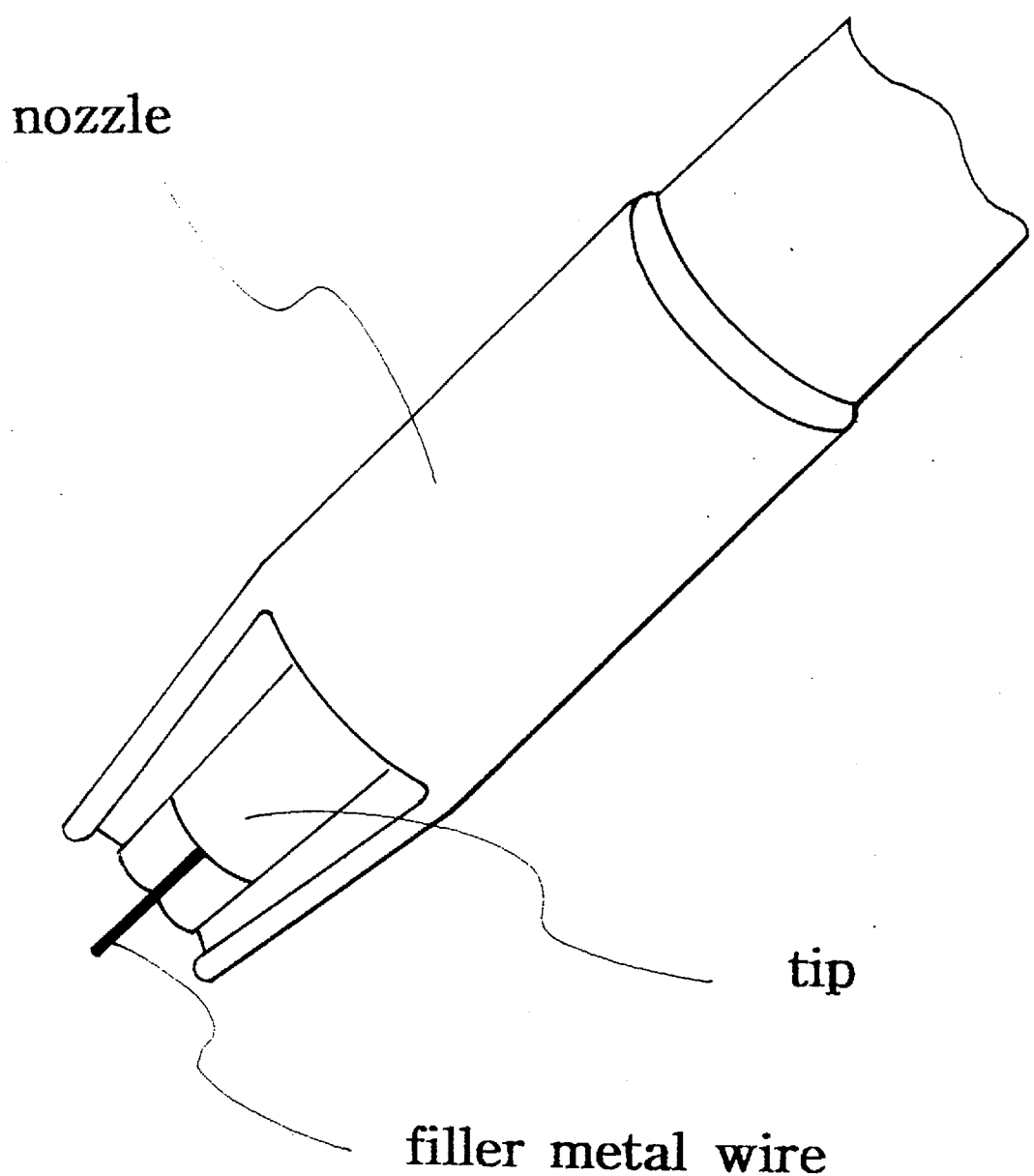
FIG. 1: A schematic diagram of a tip and nozzle for a gas welder.

It is possible for copper and copper alloys to form the copper oxide by a chemical treatment on their surface.

If a black color of copper oxide layer is formed on the surfaces of the tip and nozzle which are made of copper or copper alloys, the spatters of the melted metal were not easily sticked, or if it was deposited, it can be easily removed.

Particularly, in the case of the tip, the chemical solution is spread not only on the outer surface of the tip, but also intrudes into the small diameter hole of the tip, with the result that the copper oxide film is uniformly formed all over the skin. The copper oxide film on the inner wall of the tip makes the supply of the filler metal wire smooth. Further, the copper oxide film is inhibited from its spatters being sticked and intruded into the small hole of the tip. Consequently, the filler metal wire can be supplied without discontinuity at least during the life time of the tip which depends on the propertiy of the base material.

Table 1 shows the several usable chemical composition of solutions, the methods and the surface layer states. On this results, the color and the thickness of oxide layer could be controlled by the chemical solution, the dipping temperature and time.

Table 1, Examples of the chemical treatment and the results on surface of copper and copper alloys,

TABLE 1

Examples of the chemical treatment and the results on surface of copper and copper alloys.

| Chemical | solutn | Temp. | Dippng time | Color | Thickness |
|---|---|---|---|---|---|
| $K_2S_2O_8$ | 1% | 100° C. | 10 min | Black | 1 μm or less |
| NaOH | 5% | | | | |
| $H_2O$ | 94% | | | | |
| $K_2S_2O_8$ | 3% | 100° C. | 5 min | Black | 1 μm or less |
| NaOH | 5% | | | | |
| $H_2O$ | 92% | | | | |
| $(NH_4)_2S_2O_8$ | 3% | 100° C. | 5 min | Black | 1 μm or less |
| NaOH | 5% | | | | |
| $H_2O$ | | | | | |

What is claimed is:

1. A gas welding apparatus comprising:

a tip comprising copper, a hole in said tip, a filler metal wire protruding from and adapted to pass through said hole, and a layer comprising black copper oxide, produced by a chemical conversion coating treatment utilizing an aqueous solution of at least one persulfate, on at least a surface of said tip proximate to said filler wire, and on at least a portion of material defining said hole;

wherein said layer comprising black copper oxide is sufficient to inhibit adherence of splatters, during welding with said apparatus, of said filler metal onto surfaces of said tip and onto material defining said hole.

2. A gas welding apparatus as claimed in claim 1 wherein said tip comprises a copper alloy.

3. A method of retarding the deposition of metal splatters on a tip of a gas welding apparatus, and thereby prolonging the operational life of said apparatus, which apparatus comprises a tip comprising copper, which tip has a hole therein through which a filler metal wire protrudes and from which hole said filler metal wire is fed to said welding, which method comprises forming, on said tip, a surface comprising black copper oxide, formed by a chemical conversion coating utilizing an aqueous solution of at least one persulfate, of a thickness and of a composition such that splatters of said filler wire metal caused during welding adhere thereto to a lesser extent than they would have adhered thereto in the absence of said surface comprising black copper oxide on said tip.

4. A method as claimed in claim 3 wherein said tip comprises a copper alloy.

5. A method as claimed in claim 3 further including forming a surface comprising black copper oxide, formed by a chemical conversion coating treatment, on an inner surface defining said hole to an extent sufficient to substantially retard splatters of said filler wire metal from sticking to said inner surface during said welding.

6. An apparatus as claimed in claim 1 wherein said coating comprising black copper oxide is a reaction product of a persulfate with copper in the presence of caustic.

7. A method as claimed in claim 3 wherein said coating comprising black copper oxide is a reaction product of a persulfate with copper in the presence of caustic.

* * * * *